Oct. 2, 1962

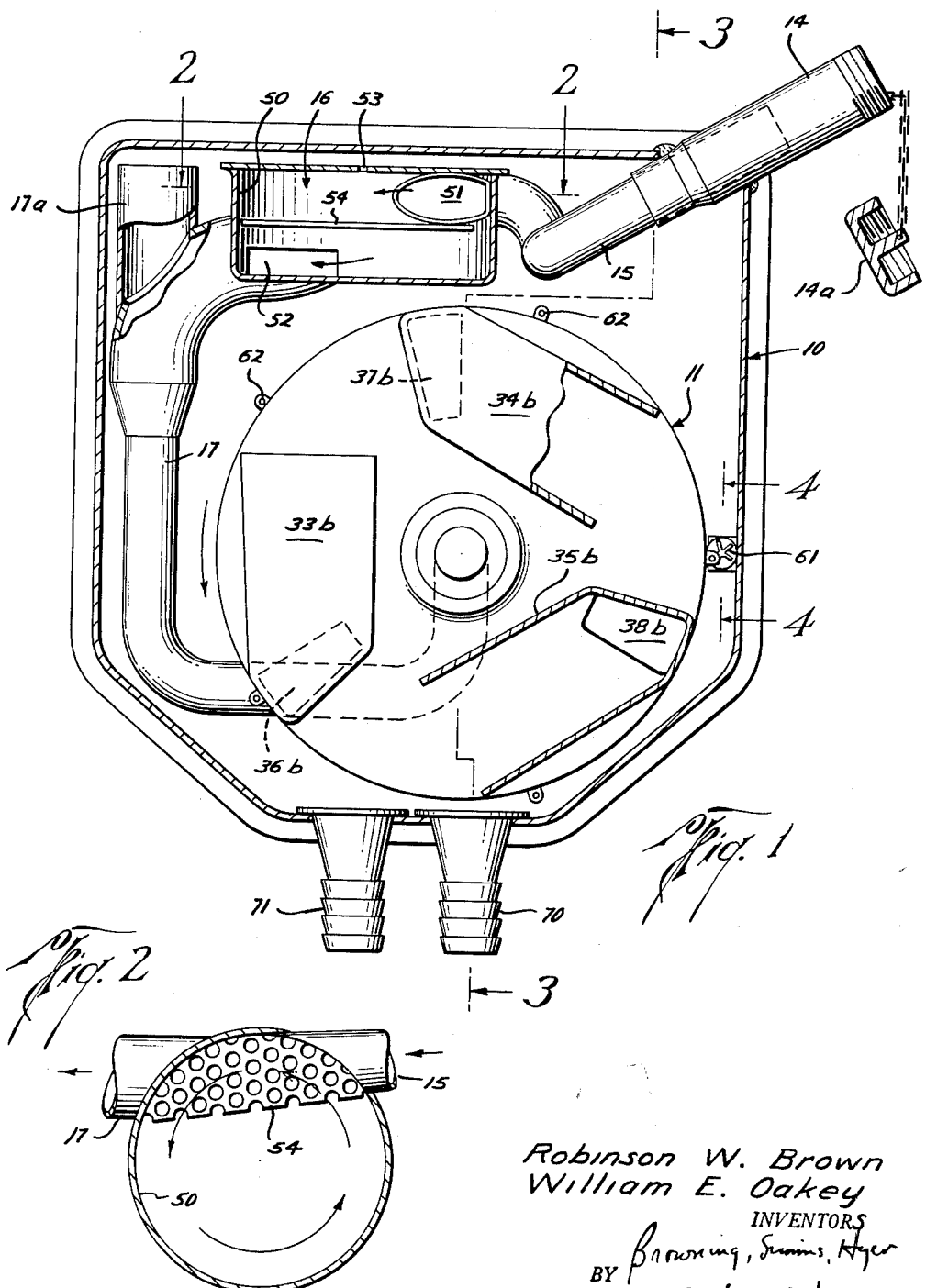

R. W. BROWN ETAL 3,056,294

VOLUMETRIC DRUM METER

Filed June 15, 1959

Robinson W. Brown
William E. Oakey
INVENTORS

BY Browning, Simms, Hyer
& Eichenroht

ATTORNEYS

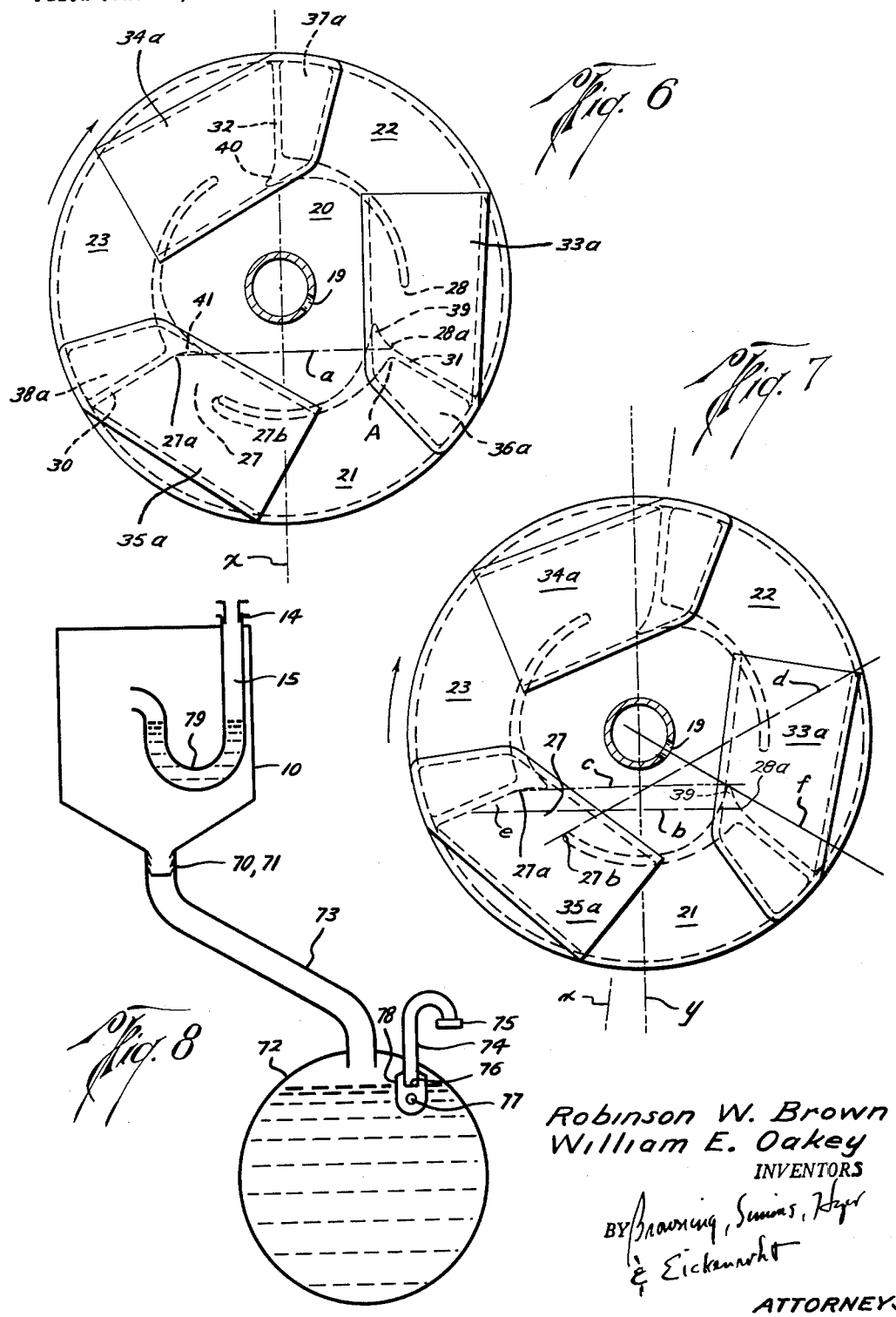

United States Patent Office 3,056,294
Patented Oct. 2, 1962

3,056,294
VOLUMETRIC DRUM METER
Robinson W. Brown, 515 Kampmann Blvd., San Antonio, Tex., and William E. Oakey, Rte. 10, Box 563, San Antonio 12, Tex.
Filed June 15, 1959, Ser. No. 820,390
16 Claims. (Cl. 73—200)

This invention relates to an improved meter of the revolving drum type and particularly to one sufficiently compact as to be mountable on a vehicle and yet which can accurately meter fuel over a wide range of flow rates. In another of its aspects, it relates to such type of meter having a registering or recording apparatus which, by a very simple manipulation, can be made to record either U.S. or Imperial gallons. In still another of its aspects, the invention relates to a system for filling a tank to a predetermined level and thereafter automatically preventing any further flow of liquid into the tank.

Meters of the revolving drum type are, of course, well-known and have found particular use in the metering of steam condensate. In general these meters include a drum which is divided into a plurality of metering compartments. Successive ones of these compartments are alternately filled and emptied as the drum rotates and, since the capacity of each compartment is known, the determination of the metered quantity simply becomes a matter of counting the number of revolutions of the drum. Previously known meters of this type have each had one or more of a number of different disadvantages. One of the principal disadvantages is that in order to meter at relatively high flow rates, the meter must be quite large. Another disadvantage of some meters is that they have been of relatively complex structure not susceptible to mass production in an economical manner. Others have displayed the desired accuracy only when the liquid being metered flows at a relatively constant rate, or fluctuates in flow rate over a very narrow range.

The foregoing and other disadvantages of the prior meters have become particularly apparent when an attempt is made to mount the meter on a vehicle to meter gasoline or other fuel into tanks on trucks or other vehicles. It has long been desirable to meter such fuel in order to provide corroboration of the billings received by trucking concerns from service stations where the drivers purchase fuel. Situations have been known to exist wherein the trucking concern was billed for a larger amount of fuel than was actually placed in the truck tanks with the value of the difference being retained by the station operator, the truck driver, or both. In fact, this practice has become so widespread that trucking concerns are being overcharged many millions of dollars each year for fuel they do not receive. Efforts have been made to develop meters which could be placed on the truck to accurately meter the amount of fuel flowing into the tanks. Such a meter must be compact, accurate over a relatively wide range of flow rates and must not be susceptible of tampering so as to be made to over-register. Drum meters heretofore known were not suited for this duty because to handle the flow rates involved (e.g. 3 to 14 g.p.m.), they had to be so large that they could not be used. Moreover, these known drum meters are not able to handle a wide range of flow rates with the required accuracy. Moreover, the typical drum meters and other meter types which might be applied to this particular problem have not provided against various means which might be deliberately used to cause them to over-register whereby the trucking concern could be over-billed. For example, most of the meters can be made to over-register simply by entraining air in the fuel, as by an air hose, as the fuel passes through the meter. Others can be forced to over-register by other and perhaps more devious means.

It is accordingly an object of this invention to provide a drum type meter which has an acceptable accuracy over a wide range of flow rates and yet which is relatively simple in design and is very compact.

Another object is to provide such a type of meter which is so constructed such that any tendency toward inaccurate metering due to high input flow rates is compensated for in such a manner that the meter's accuracy remains within accepted limits at high rates of flow as well as at low rates.

Another object is to provide such a type of meter having a few moving parts and which is of rugged compact construction so it can be mounted on vehicles to meter the fuel flowing into the fuel tanks.

Another object of the invention is to provide such a meter which cannot be caused to over-register by passing air or gas therethrough either alone or entrained in the fuel and one which cannot be tampered with so as to cause it to over-register.

Another object of the invention is to provide a system for filling a tank to a predetermined level wherein liquid is automatically prevented from entering the tank after the level therein reaches such predetermined level.

Another object of the invention is to provide a drum type meter with a registering or recording apparatus which by a simple change of one part can be converted to read out in either U.S. or Imperial gallons.

Other objects, advantages and features of this invention will be apparent to one skilled in the art upon consideration of the specification, the claims and the drawings wherein:

FIG. 1 is an illustration of a drum meter embodying the invention, the drawing being in vertical section with certain parts broken away to better illustrate the construction;

FIG. 2 is a view taken on a line 2—2 of FIG. 1 to illustrate the means for removing gases from the liquid to be metered and for preventing air hoses or the like from being inserted into the meter to cause over-registering;

FIGS. 6 and 7 are views illustrating the operation of the metering drum; and

FIG. 8 is a rather schematic view of the system for stopping liquid flow into a tank after the liquid level therein has risen to a predetermined height.

Like characters of reference are used throughout the several views to designate like parts.

Figure 3:
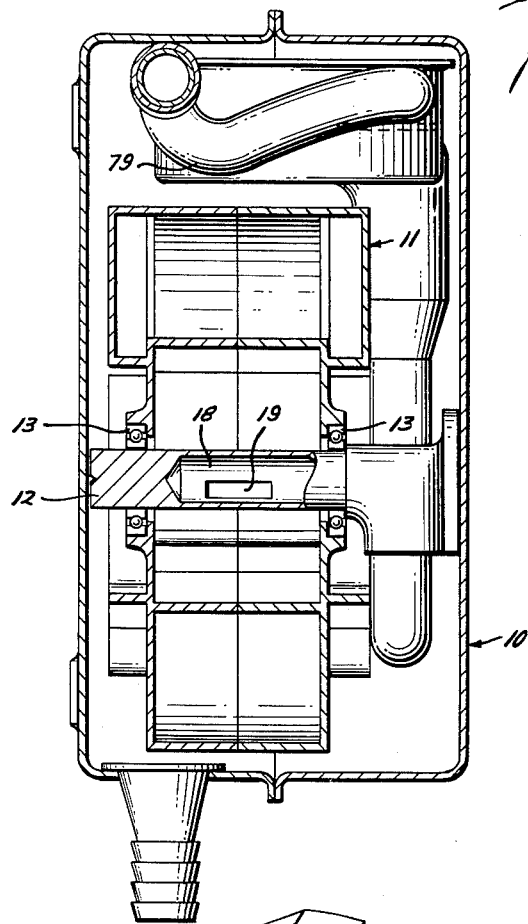
FIG. 3 is a vertical section taken on a line 3—3 of FIG. 1.
Figure 4:
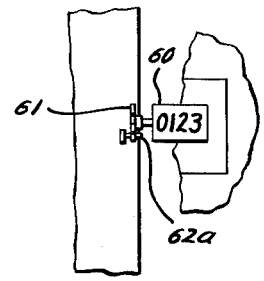
FIG. 4 is a vertical view taken on a line 4—4 of FIG. 1.
Figure 5:
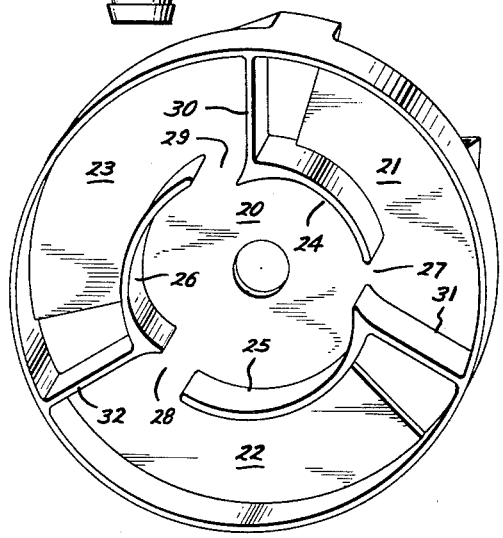
FIG. 5 is an isometric view of one-half of the metering drum showing the internal construction thereof, it being understood that the other half is a mirror image of the half shown.

Referring now to the drawings, the preferred meter includes a housing 10 which is preferably of welded construction to prevent unwanted tampering with the internal mechanism. Disposed within the housing is a metering drum 11 which is mounted for rotation in the housing about a horizontal axis. Here the mounting is shown to include a stub shaft 12 carried by the housing and onto which the drum is journaled by bearings 13.

The liquid to be metered enters the housing via a filler neck 14 which can be equipped with any suitable closure cap 14a. The liquid then passes through conduit 15, gas separator 16 and connecting conduit 17 into bore 18 in stub shaft 12. From bore 18, the liquid is discharged into the metering drum via an orifice 19 to be described in greater detail below. For the purposes of this disclosure, the filler neck and conduits 15 and 17 can be termed an inlet conduit or manifold.

The metering drum comprises a cylindrical drum having partitions therein dividing its interior into a central liquid receiving chamber 20 and a plurality of metering compartments 21, 22, and 23 disposed about the inner chamber 20. Thus, it will be seen that the central chamber is defined by a plurality of segments 24, 25 and 26 which are separated by openings 27, 28 and 29 to provide for flow from the central chamber into the respective ones of the metering compartments. Stated in another way, the chamber is defined by an inner partition, preferably annular in form, having openings 27, 28 and 29 therein. The metering compartments are defined in part by the drum shell, the inner annular partition and cross-partitions 30, 31 and 32. The arrangement is such that the metering compartments are equal in volume and preferably the compartments per se are substantially volumetrically symmetrical. That is, when a compartment is filled with liquid, the others being empty, the drum will occupy a position such that the filled compartment has an equal volume of liquid lying to either side of a vertical plane X drawn through the rotational axis of the drum (FIG. 6). This can be termed the "dead center" position for the metering compartment per se. In this position, the liquid discharged into inner chamber 20 has risen to at least the line "a" which line is at right angles to the vertical plane X. For the structure shown, the vertical plane X in effect bisects the angle between partitions 30 and 31 and for every increment of volume to the left of plane X tending to cause the drum to turn counterclockwise, there is an equal volume increment to the right counterbalancing the turning effect of the left increment. Stated in another way, when compartment 21 is at its dead center position, the leading edge 27a of opening 27 is on the same horizontal level as leading edge 28a of opening 28 into the next succeeding empty compartment 22. Of course, the other succeeding compartments will pass through similar dead center positions as the drum rotates. It will be understood that in the above discussion of the dead center position of a compartment, only the drum turning effect of the liquid in the compartment per se is considered.

Conduit means are provided for discharging liquid from a filled metering compartment responsive to rotation of the drum. Such conduit means are arranged so that, at relatively low flow rates (half maximum metering capacity or less), the discharge of liquid from the filled compartment does not begin until the trailing edge of the fill opening into that compartment rises above the liquid level in the inner chamber 20. For example, when the liquid level in chamber 20 is at line "c" or below (FIG. 7), the discharge conduit for compartment 21 will not begin to discharge liquid until trailing edge 27b of opening 27 rises above the liquid level in chamber 20. Thus, in the illustrated structure, a pair of discharge conduits is provided for each compartment, the conduits of each pair being mounted on opposite sides of the drum. As shown, the conduits comprise cups 33a and 33b for compartment 21, cups 34a and 34b for compartment 22 and cups 35a and 35b for compartment 23. These cups are preferably made as separate pieces and then bolted or otherwise fastened to the sides of the drum. The cups communicate with the trailing ends of their respective metering compartment via openings 36a, 36b, 37a, 37b, 38a and 38b. In a preferred form, the cups extend along the side of the drum to a point such that a line "d" drawn from their discharge ends to the trailing edge of the opening into the cups respective metering compartment is substantially the same radial distance from the drum axis as is line "c." Hence at relatively low flow rates, the cup's discharge ends are positioned to prevent flow therefrom until the trailing edges of the various fill openings of the metering compartment have risen above the liquid level in inner chamber 20. It will be noted that the various openings 36a through 38b extend to terminate flush with outer surface of the respective inner partition segments 24, 25, 26 and with the leading faces of the cross-partitions 30, 31, 32. Thus, gas or vapor cannot be trapped in the portion A of the metering compartments but rather the gas or vapor will be discharged through the cups so that the metering compartments can be completely filled with liquid. The construction of the cups and the openings in this way eliminates the need for special venting means which would complicate the structure. Further, with the use of the cups, a very compact, relatively simple structure is provided and yet one having a large flow capacity such that the meter is capable of handling very high rates of liqiud flow.

With the foregoing structure, it will be seen that in addition to the volume of liquid in each metering compartment per se, there will be an added increment of metered volume within the discharge cups. For example, if the drum were held so it could not rotate, the level in the cups at the time metering compartment 21 was filled would be line "a" as shown in FIG. 6. However, the added increment of volume in a cup causes the drum to turn the compartment being filled past its dead center position until the drum finds a new balance axis such as the plane Y shown in FIG. 7. In order to avoid such premature rotation of the drum causing the next succeeding compartment 22 to begin filling before the filling of compartment 21 has been completed, dams 39, 40 and 41 are provided to extend inwardly of the central chamber and are situated adjacent the leading edge of each fill opening. These dams are of such height that the liquid in compartment 20 must rise to level "c" before it can spill over into the next succeeding compartment. Were it not for these dams, liquid in chamber 20 would rise only to level "b" before it would begin spilling over into succeeding compartment 22 and therefore there would be a triangular volume "e" in compartment 21 which would not be filled. However, because of the dams, the compartments are completely filled. Stated in another manner, when a metering compartment is filled with liquid and the liquid has partially fileld the associated discharge cups to the same level and has caused the drum to move to its balance axis Y, the lip of the dam is on the same level as the leading edge of the opening into the metering compartment being filled.

It will be noted that while a dam impedes flow into the next succeeding empty compartment until the preceding compartment is filled, it does not substantially impede flow into the compartment being filled. This is due to the dam extending inwardly of the inner chamber. As a result, liquid is prevented from prematurely spilling into the next empty compartment and yet a relatively large unrestricted opening is provided into the compartment being filled. This lack of restriction to filling is important in order to handle high rates of flow of the liquid to be metered. Thus, in the particular illustrated meter, the total cross-sectional area of all the openings into the metering compartment comprises about 25% of the total circumferential area of the inner annulus defining the inner chamber. Stated in another manner, each of the comparments occupies about a 120° sector and the opening into this compartment occupies a 30° sector.

The leading faces of the dams are formed so that the dams provide only a minimum impedance to turning the drum. Thus these faces extend in a curve from the lip of the dam to merge smoothly with the inner partition a substantial distance from the dam lip. The trailing face of the dam, of course, drops rather abruptly from the lip in order to eliminate any impedance to liquid flow into a compartment as it is being filled.

Another feature which contributes to the accuracy of the meter over widely varying rates of input flow is the location and shape of discharge orifice 19. At relatively low rates of flow, the liquid level in the inner chamber will gradually rise as a metering compartment is filled and then will fall when the drum turns to place the next succeeding compartment in filling position. During high rates of input flow, however, the liquid level tends to remain at a constantly high level which in some cases may even be above orifice 19. Now if the liquid is indiscriminately discharged into chamber 20 at these high input rates, the liquid level will be high enough to cause additional liquid to flow into a compartment, after it has been filled and while liquid is being dumped from the discharge cup of such compartment, thus making the meter inaccurate. In other words there will be flow into a compartment until it is full, followed by further flow into the compartment while it is dumping. As a result, the amount of liquid dumped from each compartment will be greater during high input flow rates than the amount dumped during low input flow rates. To prevent this, orifice 19 is positioned to direct liquid downwardly in the central compartment but at an acute angle with the vertical and toward the dam adjacent the opening of the next compartment to be filled. This causes some of the liquid in the inner chamber to spill over a dam into the succeeding empty compartment prior to completion of filling of the preceding compartment. This causes the drum to turn so that the compartment being filled starts to dump before it is full. However, due to the high liquid level, enough additional liquid flows into the filling compartment during the initial portion of its dumping period such that the total amount of liquid dumped is equal to the normal metering volume of the compartment.

In order to best achieve the foregoing, the flow axis "f" of orifice 19 (a line drawn from the axis of rotation of the drum through the center of the orifice) preferably should approximately intersect the tip of the dam lip when the drum has been turned to position a metering compartment so that its balance axis is the Y plane as shown in FIG. 7. Stated in another manner, this flow axis intersects the tip of the dam lip when such lip is positioned on the same level as the leading edge of the fill opening into the compartment being filled. The orifice preferably is a long, rather narrow slot with its major dimension paralleling the axis of drum rotation. The size and shape is such that when the liquid input flow rate is about one-half of the meter capacity, the orifice begins directing some liquid flow into the succeeding compartment while the preceding compartment is still filling and, as the input flow rate to the meter is further increased, the orifice directs enough additional liquid into the succeeding compartment to speed up the drum's rotation to a degree such that the amount of liquid flowing into the filling compartment while the latter is dumping is substantially equal to the amount of liquid required to fill the compartment before it started dumping.

It will be noted that the above angular placement of the discharge orifice does not change the liquid level in the inner chamber so as to prevent flow into a metering compartment after it has been filled, but it does compensate for the high liquid level and its overfilling tendency by proportionately speeding up the drum.

In order to prevent entrained air in the liquid to be metered from causing inaccurately high meter readings, means are provided for separating air from the incoming liquid. The entrained air may arise from the use of automatic shut-off nozzles commonly used in service stations or may even be purposely injected as with an air hose in an effort to make the meter read erroneously high. In the drawings, this means is shown at 16 as including a chamber 50 which is circular in cross section. The incoming liquid, together with any entrained air, is discharged tangentially into this chamber via port 51 and leaves the chamber via port 52. It will be noted that ports 52 and 51 are both located on substantially the same side of chamber 50 so that the liquid must flow substantially completely around the chamber before leaving the same. Any entrained air or gas, being of lower specific gravity than the liquid, is forced to the center of the chamber where it is discharged via vent 53 into the housing 10 and thence through conduit 73, tank 72 and then out vent 74 to the atmosphere. Disposed between the inlet and out ports is a horizontal baffle 54, preferably perforated. This baffle not only aids in preventing incoming liquid from short circuiting to the outlet port 52, but also makes it exceedingly difficult for an operator to insert an air hose into conduit 17 for the purpose of adding entrained air to cause falsely high meter readings. A standpipe 17a, which is open at the top and extends up from conduit 17, permits escape of entrained gas which may pass through chamber 50 as may be the case when an air hose is inserted in an effort to make the meter read high.

Since the number of drum rotations is indicative of the volume of liquid metered, a suitable recording or registering means is provided to count the drum rotations. While any suitable type of such means can be employed, it has been found advantageous to use the type shown in the drawings.

In this, a conventional counter 60 is carried by housing 10 and attached to its input shaft is a star wheel 61. Disposed around the periphery of the drum are a plurality of recorder trip means 62 which are here shown as lugs on the outer surface of the drums carrying a close wound helical spring 62a which engages the teeth of the star wheel to turn the same. Thus, as the drum turns, each of the springs will in turn engage a tooth of the star wheel and turn it a fraction of a revolution equal to the number of teeth on the star wheel. In the preferred form, five, or a multiple thereof, of the recorder actuating means 62 are evenly spaced about the periphery of the drum. Then by using a five-toothed star wheel, the register shaft will be turned one revolution for each revolution of the drum. The star wheel is made removable so that a six-toothed star wheel can be used on the register shaft and it has been found that this permits registering Imperial gallons instead of the U.S. gallons as registered by the five-toothed star wheel. Thus, with this simple change, the meter can be made to read in either U.S. gallons or Imperial gallons within an accuracy of .08% insofar as the counter mechanism is concerned. The springs 62a, being flexible, serve to prevent damage to the counter in case the drum should rotate backwards due to vehicle motion.

In filling a tank with a liquid, it is sometimes desirable to limit the amount of liquid so that the filling operation ceases when the liquid in the tank has risen to a predetermined level. For example, when the apparatus of this invention is installed on a truck or other vehicle to meter the fuel, the fuel will flow through discharge ports 70 and 71 into one or more fuel tanks. Should the driver desire to fill the fuel tanks to a maximum, it will be seen that the driver could not tell when the tanks were so filled until the fuel had backed up through the meter housing into filler pipe 14. This would have several disadvantages. For example, there would be an amount of fuel in the meter housing which would not be metered. Also, subsequent expansion of the liquid, as by exposing the tanks to the hot sun, could cause the fuel to overflow from filler pipe 14, thereby creating a hazard.

In accordance with one aspect of this invention, means are provided for automatically stopping inflow of liquid into a tank upon the level therein reaching a predetermined height. Thus, referring to FIG. 8, where the means are shown somewhat schematically, tank 72 has an inlet hose or other conduit 73 leading from one of the outlets 70 or 71 from the meter housing 10. The tank is also equipped with a vent means, here shown in the form of a pipe 74 having an inverted U-shaped upper end and a cap 75. Cap 75 preferably is of the type which when turned to one position permits gas such as air to be vented from the tank and in another position forms a fluid tight seal. Disposed within the tank is a valve seat, here shown as the lower end 76 of vent 74 and a valve element 77 adapted to seat on seat 76 to prevent further escape of gas from the tank. Valve element 77 can take numerous forms but is here illustrated as a hollow ball capable of floating in the fuel in the tank. There is also provided a suitable valve cage 78 to assure that when the valve element 77 moves upwardly, it will always seat in seat 76. With this arrangement, it will be seen that as the liquid level in the tank rises, ball 77 will eventually be floated upwardly to seat on 76 to prevent further escape of vapor or air from the tank. When this happens, an additional incremental flow of liquid into the tank will cause the gas remaining therein to be compressed slightly. The resulting increased gas pressure, which is also effective in the meter housing, causes the incoming liquid to back up in filler pipe 14 and signal the operator that no more liquid should be added. In order to prevent the escape of gas so that there can be an increase in pressure, a trap 79 is provided in the inlet conduit. This trap can take numerous forms, but is here shown as a U-shaped section of the inlet conluit.

With the arrangement of FIG. 8, it is possible to selectively fill any one of a number of tanks connected to a single meter. For example, if the meter outlets 70 and 71 of the FIG. 1 are individually connected to separate tanks, each of which is provided with a vent as shown in FIG. 8, fuel can be substantially prevented from flowing into one tank by closing the cap 75 thereon. The fuel will be permitted to flow to the other tank by opening the cap 75. If both tanks are to be filled, both caps 75 thereon can be opened. Of course, a limited amount of liquid may flow into a tank with a closed cap by running down the sidewalls of conduit 73, but in many cases, conduit 73 will comprise a flexible hose which can be dropped down sufficiently to provide a trap between the inlet to tank 72 and the outlet from the meter whereby substantially no liquid can flow into the tank with the cap closed.

A better appreciation of the advantages of this invention may follow from a consideration of an actual physical embodiment thereof. Thus, a meter having a drum slightly over 11 inches in diameter and a metering compartment width of 3¼ inches was constructed. Three metering compartments were employed with a capacity such that with the metered liquid contained in the cups, one gallon of fuel was metered per drum revolution. Six discharge cups were used, a pair for each compartment located as shown in the drawings. Over a range of 3 to 14 g.p.m., the meter had an error of less than plus or minus 1 percent. It is thus apparent that the meter can accurately meter relatively high flow rates (e.g. 12 to 14 g.p.m. for the size describel) and yet is quite compact.

This application is a continuation-in-part of our co-pending application Serial No. 679,867, filed August 23, 1957 now Patent No. 3,005,343.

The invention having been described, what is claimed is:

1. A revolving drum meter comprising a housing, a drum mounted in the housing for rotation about a horizontal axis, an inner partition disposed about said axis and defining a central compartment in the drum, said inner partition having a plurality of flow openings therein, a plurality of cross-partitions respectively extending from the inner partition adjacent the leading edge of said openings to the circumferential wall of the drum thereby dividing the outer portion of the drum into a plurality of metering compartments, a dam extending inwardly of the inner portion adjacent each of said leading edges of the openings to thereby impede flow into an empty succeeding metering compartment until a preceding metering compartment has been substantially filled and, upon rotation of the drum to fill the succeeding compartment, becoming substantially ineffective to impede flow into the succeeding compartment, means for discharging liquid into said central compartment, and individual means for discharging liquid from each of the metering compartments upon each of such compartments becoming filled including lateral opening in each compartment into a corresponding discharge conduit, said opening being substantially flush with the trailing cross partition and with the inner partition in the compartment.

2. A revolving drum meter comprising a housing, a drum mounted in the housing for rotation about a horizontal axis, an annular partition in the drum coaxial with said axis and defining a central compartment in the drum and also having a plurality of flow openings therethrough, a plurality of substantially radial cross-partitions adjacent to and alternating with said flow openings and dividing the portion of the drum outwardly of the annular partition itno a plurality of metering compartments each of which upon being filled with liquid and the other compartments being empty, has a dead center position when the leading edges of the openings into the filled and the next succeeding empty metering compartments are on substantially the same horizontal level, discharge conduits respectively communicating with the metering compartments substantially flush with the inner partition one end of the metering compartment remote from said openings and extending to prevent substantial flow from the metering compartments while liquid is flowing thereinto through the respective openings, said discharge conduits receiving some of the liquid from the metering compartments during filling of the latter and thereby causing the drum to advance to move the respective metering compartments past said dead center position before such compartments are filled, a dam extending inwardly of said annular partition adjacent each of the leading edges of said flow openings to thereby impede flow into a succeeding empty metering compartment while a preceding metering compartment is being filled after it has been moved past said dead center position and, upon rotation of the drum to fill said succeeding metering compartment, becoming substantially ineffective to impede flow thereinto, and means for discharging liquid into said central compartment.

3. The meter of claim 2 wherein the area of said openings comprise about one-fourth of the total area of the annular partition.

4. The meter of claim 2 wherein the discharge conduits comprise cups fastened to the side of the drum, the cups being U-shaped in cross-section so that the side of the drum completes the conduit sections.

5. In a revolving drum meter wherein partitions are arranged in a revolving drum to provide an annular central chamber associated with means for discharging liquid thereinto and surrounded by a plurality of metering compartments each communicating with the central chamber through relatively large flow openings situated adjacent the leading ends of the respective metering compartments, the compartments having a configuration such that when only one is filled with liquid, it moves to a dead center position such that the leading edges of the flow opening thereinto is on the same horizontal level as the leading edge of the flow opening into the next succeeding empty compartment and wherein a discharge conduit is provided for each compartment with a portion of such conduit arranged to receive a volume of liquid from its compartment during filling of the latter, the conduit portion being situated toward an end of its compartment so that liquid in such portion causes the drum to rotate to move the corresponding compartment past dead center position before the compartment is filled, the improvement which comprises in combination therewith of a dam adjacent each of said openings at the leading edge thereof and extending inwardly from the wall of the annular chamber so as to susbtantially impede liquid flow into a succeeding empty chamber until a preceding chamber has been filled though the latter moves past dead center and then, upon movement of said succeeding chamber to filling position, becoming substantially ineffective to impede flow thereinto.

6. The meter of claim 5 wherein said discharge conduits comprise conduit sections mounted on the side of the drum and having one end in communication with its respective metering compartment through a substantially radial opening extending substantially across the compartment at the trailing end of the latter, the conduit sections extending around the drum so that with its compartment in filling position, the other end of said conduit is at a level as to prevent flow of liquid from the compartment.

7. The meter of claim 6 wherein said conduit sections comprise cups fastened to the side of the drum and opening into the metering compartment at the radially innermost portion thereof at the trailing end of such compartments whereby gas or vapor will vent from the compartments through the cups and not be trapped in the compartments.

8. In a metering system wherein an inlet conduit is connected to a tank which is to receive the metered liquid and a meter is provided in said conduit, the combination therewith of apparatus for stopping flow into said tank upon filling the latter to a predetermined level comprising a gas vent conduit from the tank, means for closing the vent conduit responsive to the liquid in the tank closely approaching said level, and a trap in said inlet conduit preventing escape of gas from the tank so that upon said vent conduit being closed, an added increment of liquid flow into the tank causes the pressure therein to increase sufficiently to prevent further liquid flow through said inlet conduit.

9. The system of claim 8 wherein said trap comprises a downwardly extending U-shaped conduit forming a part of said inlet conduit.

10. The system of claim 8 wherein said closing means comprises a valve element seatable in the vent conduit and having a specific gravity such that it will float on said liquid whereby upon the liquid level rising sufficiently, the valve element will float upwardly to be seated in the vent conduit.

11. A system for filling a tank to a predetermined level and then stopping flow thereinto comprising a tank, a liquid inlet conduit connected thereto, a trap in the inlet conduit preventing backflow of gas therethrough, a gas vent conduit connected to the tank, and means for closing the vent conduit responsive to the liquid level in the tank rising to approximately said predetermined level whereby additional liquid flow into the tank to raise the level to said predetermined level causes gas pressure to rise therein sufficiently to prevent further liquid flow in said inlet conduit.

12. The system of claim 11 wherein said trap is a downwardly extending U-shaped conduit section in said inlet conduit.

13. The system of claim 11 wherein said closing means comprises a valve element floatable in said liquid and a seat cooperable with the valve element to prevent gas flow out the vent conduit upon the level in the tank rising sufficiently to float the valve element onto said seat.

14. A revolving drum meter comprising a housing; a drum mounted in the housing for rotation about a horizontal axis; an annular partition in the drum coaxial with said axis and defining a central compartment in the drum and also having a plurality of flow openings therethrough; a plurality of cross partitions adjacent to and alternating with said flow openings and dividing the portion of the drum outwardly of the annular partition into a plurality of metering compartments each of which upon being filled with liquid, and the other compartments being empty, has a dead center position when the leading edges of the openings into the filled and the next succeeding empty metering compartments are on substantially the same horizontal level; discharge conduits respectively communicating with the metering compartments adjacent to one end thereof remote from said openings and extending to prevent substantial flow from the metering compartments while liquid is flowing therein through the respective openings, said discharge conduit receiving some of the liquid from the compartments during filling of the latter and thereby causing the drum to advance to move the respective metering compartments past said dead center position before such compartments are filled; a dam extending inwardly of said annular partition adjacent to each of the leading edges of said flow openings to thereby complete the flow into succeeding empty metering compartment while a preceding metering compartment is being filled after it has moved past said dead center position and, upon rotation of the drum to fill said succeeding metering compartment, becoming substantially ineffective to impede flow thereinto, and means for discharging liquid into said central compartment, including a discharge orifice positioned to direct flow of liquid downwardly into the central compartment at an acute angle with the vertical and toward a dam when the metering compartment associated with the dam is in its downmost position so that during high liquid level operation of the meter, a portion of the discharged liquid is forced over the dam after the filling compartment has been moved from its dead center position to flow into a succeeding compartment and the remainder flows into the filling compartment to fill the same.

15. In a revolving drum meter wherein partitions are arranged in a revolving drum to provide an annular central chamber associated with means for discharging liquid thereinto and surrounded by a plurality of metering compartments each communicating with the central chamber through relatively large flow openings situated adjacent to the leading ends of the respective metering compartments, the compartments having a configuration such that when only one is filled with liquid it moves to a dead center position such that the leading edges of the flow opening thereinto is on the same horizontal level as the leading edge of the flow opening itno the next succeeding empty compartment and wherein a discharge conduit is provided for each compartment with a portion of such conduit arranged to receive a volume of liquid from its compartment during filling of the latter, a conduit portion being situated toward the end of its compartment so that liquid in such portion causes the drum to rotate to move the corresponding compartment past dead center position before the compartment is filled, the improvement which comprises of a dam adjacent to each of said openings at the leading edge thereof and extending inwardly from the wall of the annular chamber so as to substantially impede liquid flow into a succeeding empty chamber until the preceding chamber has been filled though the latter moves past dead center and then, upon movement of said succeeding chamber to filling position, becoming substantially ineffective to impede flow thereinto, and in combination therewith an orifice in the means for discharging liquid into the central chamber directing the liquid to be metered downwardly but an acute angle with the vertical and toward the dam adjacent to the opening into said succeeding compartment such that when the meter is operated at relatively continuously high liquid levels in the central chamber, a part of a discharge liquid is directed by the orificed flow over the dam to a succeeding compartment before the filling compartment becomes full to thereby rotate the drum so that the additional liquid flowing into the filling compartment due to the high level in the control chamber is equivalent to that which would be required to fill the filling compartment.

16. A metering system comprising a housing; a revolving drum type meter mounted in the housing for rotation about a horizontal axis and having a drum with a plurality of circumferentially disposed metering compartments therein which are successively filled and emptied to meter the flow through the system; a cylindrical separation chamber having liquid inlet and outlet ports adjacent to each other on the same side of the chamber but spaced vertically from each other; a single segmental baffle extending horizontally partially across the chamber at a level between said ports; an inlet line for liquid to be measured extending from the exterior of said housing to the inlet port of said chamber; an outlet line from said chamber extending from said outlet port to an inlet of the meter, said outlet line having a substantially vertical section; and a substantially vertical standpipe having an open upper end communicating with an upper part of said vertical section.

References Cited in the file of this patent

UNITED STATES PATENTS

| | | |
|---|---|---|
| 1,109,804 | Wagley | Sept. 8, 1914 |
| 1,455,757 | Barnes | May 15, 1923 |
| 1,575,782 | Mowry | Mar. 9, 1926 |
| 2,020,012 | Ayres | Nov. 5, 1935 |
| 2,158,381 | Raymond | May 16, 1939 |
| 2,249,180 | Scully et al. | July 19, 1941 |
| 2,277,651 | Steele | Mar. 24, 1942 |

FOREIGN PATENTS

| | | |
|---|---|---|
| 941,325 | Germany | Apr. 5, 1956 |